Figure 1:
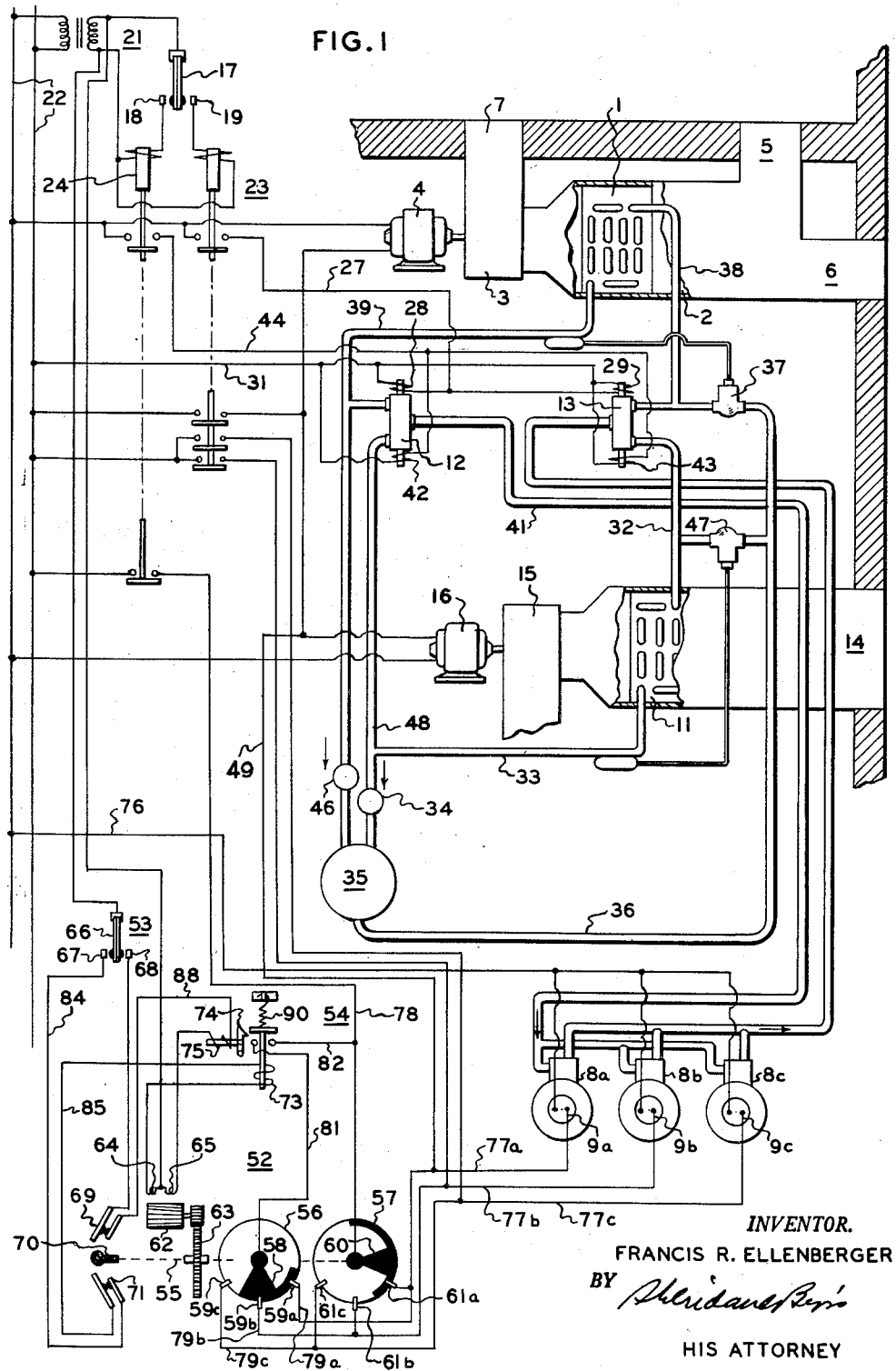

INVENTOR.
FRANCIS R. ELLENBERGER
BY
HIS ATTORNEY

United States Patent Office 2,776,543
Patented Jan. 8, 1957

2,776,543

STEP-MODULATED CONTROL SYSTEM FOR AIR CONDITIONING APPARATUS

Francis R. Ellenberger, North Caldwell, N. J., assignor to General Electric Company, a corporation of New York Application May 10, 1954, Serial No. 428,708

9 Claims. (Cl. 62—4)

The present invention relates to a step-modulated control system for air conditioning apparatus comprising a plurality of heating or cooling units.

It is well known that air conditioning apparatus, whether used for heating or cooling or both, is most satisfactory from the comfort standpoint if designed to deliver continuously the minimum output necessary to satisfy the load requirements at all times. However, as the load demand on the apparatus will vary considerably with changes in weather conditions, it is desirable to provide air conditioning apparatus, the output of which can be varied to meet demand changes of either short or long duration. In general apparatus of this type includes a variable output conditioning means comprising for example a plurality of heating units or cooling units which can be selectively operated in accordance with the base load requirements of the dwelling or other structure being conditioned under all demand requirements. Accordingly it is a principal object of the present invention to provide a control system for air conditioning apparatus of this type whereby the output of the apparatus can be adjusted to match closely the load requirements at all times.

A further object of the invention is to provide a control system adapted to operate air conditioning apparatus at the lowest possible output level necessary to carry the base load with means for increasing the output level to take care of any short duration demands in excess of the base load requirements. Another object of the invention is to provide an electrical control system for air conditioning apparatus arranged to increase immediately the output of the apparatus upon an increased demand and to maintain the increased output until such time as it is established that the base load requirements on the apparatus have again been provided.

A still further object of the invention is to provide a control system of the error-integrating type with response in finite steps and with the added feature of instant response to any increase or decrease in the demand load.

While a control system adapted to accomplish the above objects can be employed with any multiple unit air conditioning apparatus to obtain optimum comfort conditions within the conditioned structure, certain added advantages are obtained in its use in connection with refrigerating systems and particularly reversible refrigerating systems, i. e., heat pumps. A variable and controllable output is desirable in connection with a heat pump used as a heating system since a heat pump will not only operate most efficiently, but will also provide the greatest comfort when continuously delivering the amount of heat necessary to match the heat loss of the dwelling or other structure under all conditions. Accordingly it is a further object of the present invention to provide a heat pump including a variable output compressor means and a control system adapted to maintain the output of the compressor means at a level sufficient to carry the base load of the structure being conditioned and to increase or decrease the output of the compressor means to meet demand changes of either short or long duration.

Further objects and advantages of the invention will become apparent as the following description proceeds and the features of novelty which characterize the invention will be pointed out with particularity in the claims annexed to and forming a part of this specification.

In carrying out the objects of this invention there is provided an air conditioning apparatus having a variable output means and an electrical system for controlling the operation of the output means in accordance with the load or demand requirements. The control system is adapted to operate the output means normally at a minimum or base output level determined by the base load existing at the particular time. Upon either a temporary or permanent increase in the demand, switch means responsive to the temperature of the conditioned space are provided for automatically and immediately increasing the output of the compressor means and for continuing the operation of the output means at the increased output level until such time as the control system indicates that the base load requirements are being or have again been satisfied.

For a better understanding of the invention reference may be had to the accompanying drawing in which the single figure is a diagrammatic illustration of a heat pump installation provided with an electrical control system embodying the invention. While the control system of the present invention may be used for regulating the output of an air conditioning apparatus comprising a plurality of space heating or cooling units on either the cooling or heating cycle, it is particularly adapted for improving the efficiency of a heat pump as a heating system and its operation will accordingly be specifically described in connection with the operation of a heat pump as a heating system.

Referring now to the drawing, the heat pump system illustrated includes an indoor heat transfer coil or unit 1 arranged in a duct 2 through which air to be conditioned is circulated by a blower 3 driven by a motor 4, return air being admitted to the duct 2 through an inlet 5 and fresh air through an inlet 6, and conditioned air being returned to the rooms through an outlet 7. The heat transfer unit 1 may be connected either as the evaporator or the condenser of a refrigerating system or heat pump so that the air in the duct 2 may be either heated or cooled as desired. The heat pump includes a refrigerant compressor means of the variable output type which is shown for the purposes of illustrating the present invention as comprising three separate compressors $8a$, $8b$, and $8c$ respectively driven by electric motors $9a$, $9b$, and $9c$. While a plurality of compressors is shown for the purpose of providing a variable output, insofar as the present invention is concerned, a multicylinder compressor including means for rendering one or more of the cylinders partially or completely inoperative as required or a multi-speed compressor obviously can be substituted.

In the modification illustrated, the three compressors are connected in parallel and this compressor means in combination with an outdoor heat transfer coil or unit 11 and the indoor heat transfer unit 1 form a closed refrigerant circuit provided with three-way reversing valves 12 and 13 for selecting either the heating or the cooling operation. The heat transfer unit 11 is arranged in an outdoor air duct 14 arranged to conduct outdoor air by means of blower 15 driven by a motor 16 and to circulate the air over the outdoor coil 11 and return it to the outside of the structure through a duct connection (not shown). The changeover of the operation of the heat pump from heating to cooling or vice versa is controlled by operation of a bimetallic blade thermostat 17 arranged to engage a heating contact 18 when the ambient temperature is below a predetermined value and a cooling contact 19 when the temperature is above a higher predetermined value. This thermostat may be located in the space being conditioned or outdoors as desired. This reversal control system is connected to the secondary of a transformer 21 the primary of which is connected across supply lines 22 and upon operation of the thermostat 17 either a cooling relay 23 or a heating relay 24 is operated. The cooling relay 23 is provided with a plurality of switches, the lower three of which energize the fan motors 3 and 16 and the three compressor motors 9a, 9b and 9c thereby starting the operation of the heat pump on a cooling cycle. During the cooling season, the compressor means operates to supply hot compressed refrigerant to the outdoor heat exchange unit 11 through the valve 13 and the indoor heat exchange unit 1 is connected as an evaporator to cool the air circulating through the duct 2. This operation is effected upon movement of the thermostat 17 to engage the right hand contact 19 and actuate the cooling switch 23 to close the normally open upper contacts thereof. The upper contacts of the switch 23 complete a circuit from one of the lines 22 through a connection 27, then in parallel through the upper solenoids 28 and 29 of the three-way valves 12 and 13 and back to the other of lines 22 through a connection 31. The compressor means energized by the lower three switches of relay 23 operates to discharge hot compressed refrigerant to the valve 13 thence through the lower outlet of the valve and a conduit 32 to the heat transfer unit 11 where the refrigerant is cooled and liquefied upon giving up heat to the outdoor air circulated through the duct 14. The liquefied refrigerant then flows through a connection 33 and a check valve 34 to a liquid receiver 35. From the liquid receiver, the refrigerant flows through a liquid line 36 to the indoor heat transfer unit 1 through expansion valve 37 and a connection 38. The liquid refrigerant in the unit 1 is vaporized by the absorption of heat from the air flowing through the duct 2 and the vaporized refrigerant is returned to the compressor means through connection 39, the upper inlet of the valve 12 and a suction line 41 connecting the outlet of the valve 12 and the intake of the compressor means.

During the heating season when the temperature falls to a predetermined value below the range of operation during the cooling season, the thermostat 17 moves to the left to engage the contact 18 and energize the coil of the switch 24, this coil being connected across the secondary of the transformer 21 through the thermostat. Upon energization of the switch 24, its upper set of contacts closes and energizes the circuit for actuating solenoids 42 and 43 of the valves 12 and 13. This circuit may be traced from one of the lines 22 through the upper contacts of switch 24, a connection 44, the coils 42 and 43 in parallel, and thence to the other line 22 through the connection 31. Energization of the coils 42 and 43 shifts the valves 12 and 13 so that the compressor means will deliver hot compressed refrigerant to the indoor unit 1 through connection 38, the thermostatic expansion valve 37 closing to prevent passage of refrigerant into the line 36. The refrigerant is liquefied in the unit 1 upon giving up heat to the air passing through the duct, and the air is thereby warmed and returned to the rooms. The liquefied refrigerant then flows through the line 39 and the check valve 46 to the receiver 35 from which it flows through the line 36 to the unit 11 under control of a thermostatic expansion valve 47. The refrigerant in the unit 11 is vaporized by the absorption of heat from the outdoor air flowing through the duct 14 and the vaporized refrigerant is returned to the compressor means through a return line connection comprising the line 33, a connection 48, the valve 12 and the suction line 41.

Also upon energization of the switch 24 by contact of thermostat blade 17 with the heating contact 18, the fans 4 and 16 and the operation of the compressor is placed under control of the electrical control system of the present invention including a sequential control device generally indicated at 52. This control device which effects the sequential operation of the compressors 8a, 8b and 8c forms a part of a control system comprising the thermal switch 53 and a switch 54.

The sequence control device 52 comprises a shaft 55 which drives drum contactor type switches including switch plates 56 and 57. Switch plate 56 has a conducting area 58 arranged to contact one of the three contacts 59a, 59b and 59c depending upon the position of the plate 56 of the switch. The drum contactor 57 is provided with a conducting area 60 having a somewhat greater circumferential length than the conducting area 58 so that it can, upon rotation of the plate 57, make contact with one or more of the contacts 61a, 61b and 61c.

The shaft 55 is slowly driven in either direction through a reducing speed gear train 63 connected to a reversible motor 62 which has two field coils 64 and 65. Upon energization of field coil 64 the shaft 55 and the contactor plates 56 and 57 are rotated in a clockwise direction while the energization of the field coil 65 serves to rotate these elements in a counterclockwise direction. The energization of the field coils 64 and 65 is controlled by circuits including the temperature responsive switch 53 having a temperature responsive element 66 movable between two limiting positions. When element 66 is in one of these positions in engagement with contact 67, field coil 64 is energized while engagement of the element 66 with the contact 68 energizes field coil 65. In order to limit the rotation of the sequential control device, limit switches are provided in each of the circuits energizing the field coils 64 and 65. The limit switch 69 when contacted by the arm 70 mounted on shaft 55 opens the circuit including the field coil 65 whereas upon the opposite limiting rotation of the shaft 55, the arm 70 in cooperation with the limit switch 71 opens the circuit including the field coil 64.

Switch 54 is also controlled by the thermal switch 53. Upon contact of the temperature responsive element 66 with contact 67 the solenoid coil 73 is energized whereby the switch 54 is closed and is held closed by means of the latching mechanism 74. The latching mechanism 74 is released upon the energization of the coil 75 which is in the circuit energized upon the contact of the element 66 with the contact 68. In place of the latch 74, a suitable holding coil or other device adapted to maintain switch 54 closed after deenergization of the circuit including coil 73 may be employed. It will be obvious that any switch can be employed which includes means for actuating the switch to a closed position upon energization of the circuit including coil 73 and means for opening the switch only upon energization of the circuit including coil 74.

Upon a call for heat by the thermostat 17, closing of the lower contacts of the switch 24 places the fan motors 4 and 16 and the compressor means under the control of circuits including the sequence control device 52, the operation of which is, in turn, under control of the bimetallic element 66 of the thermostat 53. The compressor circuits can be traced from one of the supply lines 22, connection 76 and in parallel to the three compressor motors 9a, 9b and 9c. The three parallel circuits respectively including the compressor motors are continued through connections 77a, 77b and 77c to contacts 61a, 61b and 61c and back to the other supply line 22 through drum contactor plate 57 and the lower contacts of switch 24 through connection 78. The circuit which controls the operation of the compressor means in accordance with the base load requirements of the heat pump is essentially under the control of the drum contactor plate 57, the position of which determines the number of compressors actuated by this circuit. The fan circuits include the lower contacts of switch 24, connection 78, contactor plate 57 and connection 49 so that the fans are under control of contact 61a cooperating with contactor plate 57.

In parallel with a portion of this circuit is a second compressor control circuit adapted under certain conditions to operate an additional compressor. This circuit includes three parallel lines 79a, 79b and 79c respectively joined to connections 77a, 77b and 77c and leading to the contacts 59a, 59b and 59c cooperating with switch plate 56. From the switch plate 56 the circuit includes the connection 81 to the relay 54 and the connection 82 from relay 54 to the line 78 forming the return line in the first compressor control circuit.

With the various parts of the sequence controller 52 in the positions shown and with switch 54 open, the conducting area 60 of the plate 57 completes the first compressor control circuit only through contact 61a so that only the compressor 8a driven by motor 9a is in operation to supply the base load requirements for the heat pump. Under such conditions when the floating thermostat element 66 is not in contact with either of the contacts 67 and 68 a continuous supply of heat is furnished to the structure by the output of the compressor 8a.

In the event that additional heat is called for by the movement of the thermostat element 66 to the left into contact with contact 67, a circuit is completed from the secondary of transformer 21 through the element 66, contact 67, connection 84, limit switch 71, connection 85, coil 73 and field winding 64 of the motor 62. The energization of this circuit closes relay 54 which immediately completes the second compressor control circuit from one of the supply lines 22 through the connection 78, connection 82, relay 54, connection 81, the conducting area 58 on the plate 56, contact 59b, lines 79b and 77b, motor 9b, and back to the supply line through connection 76. Compressor 8b is thereby placed in operation for the purpose of meeting the increased demand for heat as called for by the thermostat 53. At the same time, the energization of the field coil 64 causes the motor 62 to drive the sequence control device 52 in a clockwise direction. So long as the thermostat element 66 touches the contact 67, the clockwise rotation of the control device 52 will continue until the circuit is eventually broken by contact of the arm 70 with the limit switch blade 71.

If the call for additional heat is substantial, the continued rotation of sequence control device 52 will, after a period of time, for example about 10 to 15 minutes, bring the conducting area 60 on the plate 57 into contact with both contacts 61a and 61b whereupon the motor 9b driving compressor 8b comes under the control of the switch plate 57 and is added to that portion of the compressor means furnishing the base load requirements for the heat pump. As contact is made between the conducting portion 60 and the contact 61b the conducting portion 58 of the plate 56 completes the circuit including contact 59c which in turn energizes motor 9c and adds the compressor 8c to the system under control of the locking switch 54. Further substantial rotation of the sequence controller will then be interrupted by contact of the arm 70 with the limit switch 71 to open a motor circuit, but all three of the compressors will continue to operate at their combined heat output level so long as thermostat blade 17 touches contact 18 and thermostat element 66 does not engage contact 68.

On the other hand if the increased demand for heat is slight and is quickly satisfied by the added output of the compressor 8b, the thermostat blade 66 will move to an intermediate position breaking contact with contact 67 and deenergizing the timer motor circuit. With the floating thermostat element 66 in an intermediate position not in contact with either of the contacts 67 or 68 and assuming that the sequence controller has not rotated in a clockwise direction a sufficient distance to disturb the original settings of switch plates 56 and 57, the compressor 8a under control of the base load switch plate 57 and the compressor 8b, under control of the switch plate 56 and the switch 54 held closed by latch 74 will continue to operate so that heat transfer unit 1 is supplied continuously with the output of two compressors. When the heat requirements have been fulfilled to an extent that the thermostat blade 66 moves to the right into engagement with contact 68, a circuit for driving the motor in the opposite direction is completed from the secondary of the transformer 21 through the element 66, contact 68, limit switch 69, connection 88, the latch releasing solenoid coil 75, and the motor coil 65 back to the secondary of the transformer. The completion of this circuit releases the latching means 74 so that the switch 54 is opened by the action of spring 90. As a result the energizing circuit for the compressor 8b is immediately broken and this compressor is dropped out of the heat pump circuit and the heat demands for the structure are then supplied only by the compressor 8a under the control of the switch plate 57. As long as element 66 engages contact 68, the sequence control device 52 will rotate in a counterclockwise direction, the maximum rotation in this direction being limited by the arm 70 opening limit switch 69. If the counterclockwise rotation of the sequence control device is substantial, conducting area 60 on plate 57 will move out of engagement with the contact 61a and at the same time the conducting area 58 on plate 56 will disengage contact 59b whereupon the compressor 8a driven by motor 9a comes under the control of the drum contactor 56. Upon further rotation, arm 70 will engage limit switch 69, stopping further counterclockwise rotation of the sequence control device. At this point, further operation of the system will depend upon whether there is again a call for heat or for cooling by the thermostats 17 and 53. If there is a call for heat, the latching switch 54 will complete the circuit through conducting area 58, contact 59a, etc. and the sequence control device 52 can again be rotated in a clockwise direction to bring additional compressors into operation on a heating cycle. On the other hand, if the thermostat blade 17 calls for cooling the entire control system, which includes the sequence control device 52, will be thrown out of operation and the heat pump will be under the control of the thermostat blade 17 through the cooling contact 19.

From the above it will be seen that the operation of the control system including the sequence controller 52 provides a general level of heat output which is determined by the position of the sequence control device. Whenever the thermostat element 66 touches the contact 67, one of the three compressors, or an additional compressor if some are already operating, is immediately energized. In addition, the sequence controller 52 rotates so as eventually to add sequentially one or more additional compressors to the heat pump circuit. When the room temperature sensed by the thermostat 53 is in a relatively narrow band such that the element 66 does not touch either contact, the heat output remains constant whether it be zero, that is with none of three compressors operating, at the maximum with all three compressors operating, or at any step in between. The function of the latching relay 54 is to anticipate the action of the control device 52 by immediately adding the next higher step of heat output the moment that the thermostat 53 calls for heat. If the element 66, subsequently touches the contact 68, the added compressor is immediately rendered inoperative by the opening of relay 54 and the compressor means output reduced to the base load step as represented by the number of compressors energized by the circuit including switch plate 57.

Essentially this control system is of the integrating type with the response being in finite steps and with the additional feature of instant response should the room temperature change or the thermostat 53 be readjusted to a new setting. It will be observed that the length of the "on" and "off" times for the compressor added to the heat pump circuit by the portion of the control circuit including the plate 56 depends on the transit time of the floating element 66 between the contacts 67 and 68. When the heat loss of the structure being heated is high as compared to the base heat input, transit time is long from the contact 67 to the contact 68 and short back again to the contact 67. This gives a long "on" time for the modulated step, that is the step during which the added compressor under the control of the switch plate 56 is in operation, and a short "off" time during which that compressor is removed from the heat pump system. The opposite situation prevails under low heat loss conditions of the structure served by the heat pump as compared to the base heat input. Then the temperature of the structure rises rapidly when the modulated step is on and decreases slowly when it is off. Thus the thermostat follows the integrating action of the structure and controls the operation of the pump for maximum efficiency and comfort.

While this invention has been illustrated in connection with the particular type of sequence control device for a heat pump, various other modifications and applications of the control system will be readily apparent to those skilled in the art. It is not, therefore, desired that the invention be limited to the specific construction illustrated and described, and it is intended by the appended claims to cover all modifications that fall within the spirit and scope of the invention.

I claim:

1. An electrical control system for controlling the operation of a heat pump having variable output compressor means in accordance with the demand on said pump, said control system comprising a first circuit for operating said compressor means at a base output level corresponding substantially to the base load demand on said pump, a second circuit including thermal switch means responsive to an increase in the demand on said pump for immediately operating said compressor means at an increased output level and continuing the operation thereof at said increased level until said increased demand is met, and switch means in said first circuit controlled by said thermal switch means for effecting continued operation of said compressor means at said increased output level under control of said first circuit after a predetermined period of operation of said compressor means at said increased output level under the control of said second circuit.

2. An electrical control system for controlling the operation of a heat pump having variable output compressor means in accordance with the demand on said pump, said control system comprising a first circuit including a base load switch for operating said compressor means at a base output level corresponding substantially to the base load demand on said pump, a second circuit including thermally responsive switch means responsive to an increase in the demand on said pump for immediately operating said compressor means at an increased output level and continuing the operation thereof at said increased level until said increased demand is met, switch means in said first circuit controlled by said thermal switch means for effecting continued operation of said compressor means at said increased output level under control of said first circuit after a predetermined period of operation of said compressor means at said increased output level under the control of said second circuit, and means controlled by said thermal switch means and responsive to a decreased demand on said pump for de-energizing said second circuit.

3. In combination with a heat pump including a variable output compressor means for supplying compressed refrigerant, an electrical control system comprising a first circuit including a base load switch for effecting operation of said compressor means at an output level substantially corresponding to the base load demand on said heat pump, a timer motor for operating said base load switch, a temperature responsive switch for controlling the operation of said motor in response to a change in the demand on said pump, means controlled by said temperature responsive switch for effecting operation of said compressor means at a higher output level upon an increased demand on said heat pump, a latching switch for continuing the operation of said compressor means at the higher level independent of said temperature responsive switch, and means responsive to a decreased base load demand for opening said latching switch.

4. In combination with a heat pump including variable output compressor means for supplying compressed refrigerant, an electrical control system for operating said compressor means in accordance with the demand on said pump, said control system comprising a sequential control device including a first circuit having therein a base load switch for effecting operation of said compressor means at less than its full capacity, a second circuit including locking switch means and an adding switch for increasing the output of said compressor means, a reversing timer motor actuating both the base load and adding switches, temperature responsive means operable in response to change in the demand on said heat pump for energizing said motor and for closing said locking switch means upon an increased demand on said pump, and means responsive to a subsequent decreased demand on said pump for releasing said locking switch means.

5. In combination with a heat pump including a variable output compressor means for supplying compressed refrigerant, an electrical control system comprising a first circuit including a first rotary drum contactor for controlling said compressor means at a base output level to meet a base load demand on said pump, a second circuit in parallel with the first circuit and including a latching relay and a second rotary drum contactor for increasing the output of said compressor means to a higher level upon energization thereof, a timer motor for driving both of said drum contactors, a floating thermostat movable between two limiting positions, movement of said floating thermostat to one limiting position in response to an increased demand on said heat pump effecting a closing of the latching relay and energization of said timer motor for rotation of said drum contactors in one direction, movement of said thermostat to an intermediate position between said limiting positions effecting an opening of said motor circuit, movement of said thermostat to the other limiting position energizing said timer motor to rotate said drum contactors in the opposite direction and opening said latching relay, said first drum contactor being adapted to effect an increased output of said compressor means at said higher level under control of said first circuit after rotation in said one direction for a predetermined time.

6. In combination with a heat pump including a plurality of compressors for supplying compressed refrigerant, an electrical control system comprising means for operating less than all of said compressors in accordance with the demand on said heat pump, a motor for operating said operating means, temperature responsive means for controlling the operation of said motor in response to a change in the demand on said pump, switch means controlled by said temperature responsive means for increasing the number of compressors operating upon an increased demand on said heat pump, locking means for said switch means, and means responsive to a decreased demand for releasing said locking means.

7. In combination with a heat pump including a plurality of compressors for supplying compressed refrigerant, an electrical control system comprising means for actuating one or more of said compressors in accordance with the base load demand on said heat pump, a timer motor for operating said actuating means, a temperature responsive switch for controlling the operation of said motor in response to a change in the demand on said pump, means controlled by said temperature responsive switch for actuating an additional one of said compressors upon an increased demand on said heat pump, a latching switch for continuing the actuation of said additional compressor independent of said temperature responsive switch, and means responsive to a decreased base load demand for opening said latching switch.

8. In combination with a heat pump including a plurality of compressors for supplying compressed refrigerant, an electrical control system for operating said compressors in accordance with the demand on said pump, said control system comprising a sequential control device including a circuit having therein a base load switch for sequentially placing one or more of said compressors in operation, a second circuit including locking switch means and an adding switch for controlling the operation of an additional one of said compressors, a reversing timer motor actuating both the base load and adding switches, temperature responsive means operable in response to change in the demand on said heat pump for energizing said motor and for closing said locking switch means upon an increased demand on said pump, and means responsive to a subsequent decreased demand on said pump for releasing said locking switch means.

9. In combination with a heat pump including a plurality of compressors for supplying compressed refrigerant, an electrical control system comprising a first circuit including a rotary drum contactor for operating one or more of said compressors to provide a minimum output of compressed refrigerant sufficient to meet the base load demand on said pump, a second circuit in parallel with the first circuit and including a latching relay and a second rotary drum contactor for controlling the operation of an additional one of said compressors, a timer motor for driving both of said drum contactors, a circuit including a floating thermostat movable between two limiting positions for controlling the operation of said motor and said latching relay, movement of said floating thermostat to one limiting position in response to an increased demand on said heat pump effecting a closing of the latching relay and energization of said timer motor for rotation of said drum contactors in one direction, movement of said thermostat to an intermediate position between said limiting positions effecting an opening of said motor circuit, and movement of said thermostat to the other limiting position energizing said timer motor to rotate said drum contactors in the opposite direction and opening said latching relay.

References Cited in the file of this patent
UNITED STATES PATENTS

| | | |
|---|---|---|
| 2,071,178 | Roessler | Feb. 16, 1937 |
| 2,215,327 | Karston | Sept. 17, 1940 |
| 2,221,688 | Gibson | Nov. 12, 1940 |
| 2,300,560 | Faber | Nov. 3, 1942 |
| 2,308,555 | Tate | Jan. 19, 1943 |
| 2,335,071 | Lynch | Nov. 23, 1943 |
| 2,458,683 | Cowherd et al. | Jan. 11, 1949 |
| 2,470,996 | McGrath | May 24, 1949 |